June 17, 1958   S. J. SCHUSTER   2,839,157
SAND OR EARTH FILTER FOR SHELTERS
Filed July 31, 1956
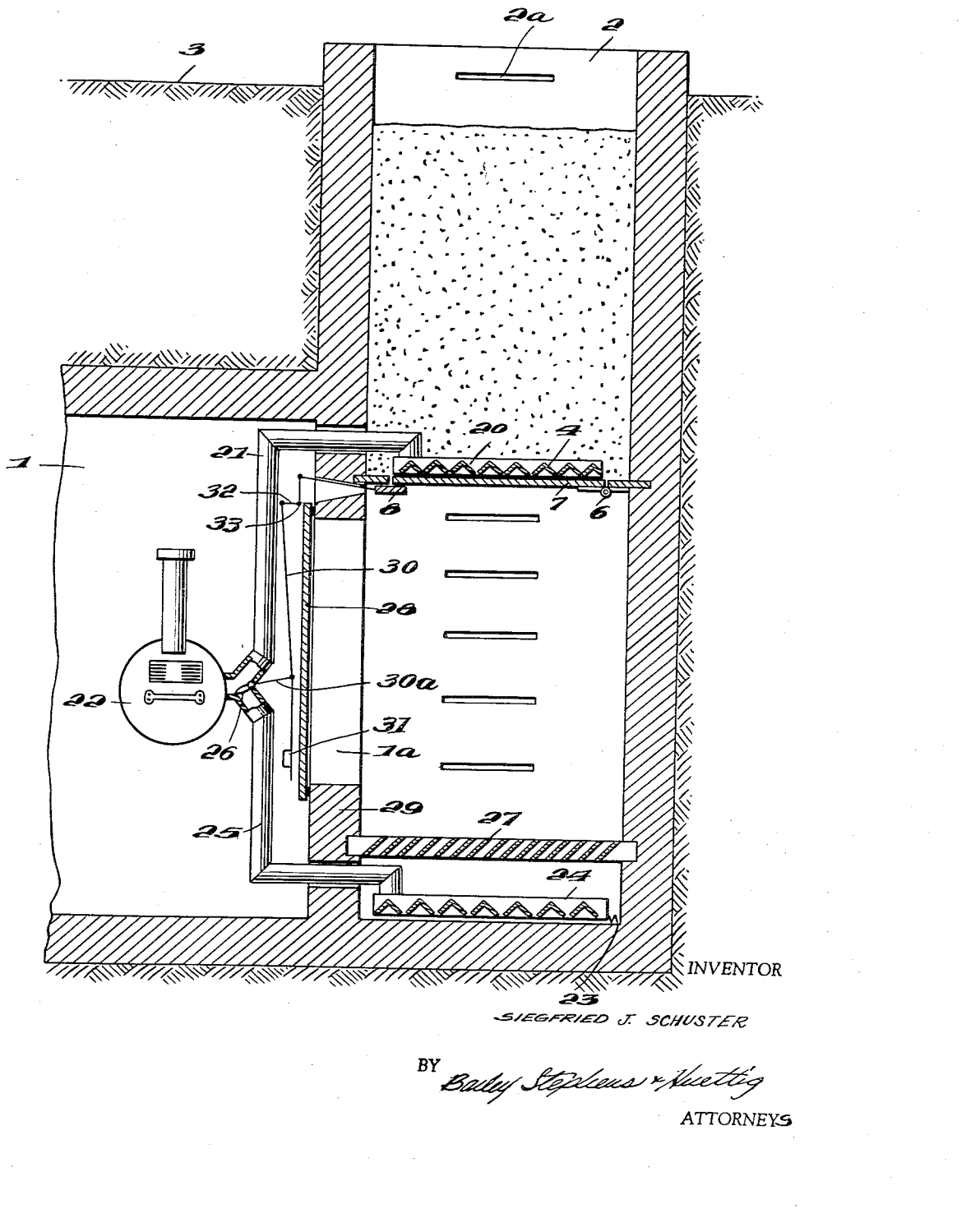
INVENTOR
SIEGFRIED J. SCHUSTER
BY
*Bailey Stephens & Huettig*
ATTORNEYS United States Patent Office 2,839,157
Patented June 17, 1958

2,839,157

SAND OR EARTH FILTER FOR SHELTERS

Siegfried Joachim Schuster, Lubeck, Germany, assignor to Otto Heinrich Drager, Lubeck, Germany Application July 31, 1956, Serial No. 601,234

Claims priority, application Germany August 18, 1955

8 Claims. (Cl. 183—41)

This invention relates to sand or earth filters for shelters, particularly underground air raid shelters.

The objects of this invention are to improve upon the air raid shelters described in the copending application of Otto Heinrich Drager, Serial No. 477,843, filed 27 December 1954, for "Sand or Earth Filter," and in particular to provide a means for salvaging the filter material after its premature removal from use in the filter.

In general, these objects are obtained by constructing a filter shaft outside of a shelter, but communicating therewith. Partially filling this shaft is the filtering material supported upon a trap door on which rests an upper filter holding grate for supporting the filter material. A second lower filter grate is placed on the bottom of the shaft. Each filter grate is connected to an air pump in the shelter through air ducts. When the upper filter grate support is removed in order to free the upper portion of the shaft from the filter so that egress can be made therethrough, the filter material is dumped to the bottom of the shaft and on top of the second lower filter support. Thus, a second filter unit ready for immediate use is obtained.

This arrangement is particularly valuable when, upon removal of the upper filter support, it is found that the atmosphere is still contaminated, thus compelling users of the shelter to remain therein. Then, continued safe use of the shelter is insured by reason of the second filter when the upper filter support is removed prematurely as in a panic.

The means by which the objects of the invention are obtained are disclosed more fully with respect to the accompanying drawing, which shows a cross-sectional view of a filter-containing emergency escape shaft for an air raid shelter.

The air raid chamber 1 communicates through opening 1a with a vertical shaft 2 which rises to a point above the surface of the ground 3. This shaft may be provided with rungs 2a on one wall thereof to facilitate the climbing out of the shaft.

Arranged within the shaft is an upper filter grate support 4 seated upon a trap door 7 secured on one side by a hinge 6 and on the other side by a locking bolt 8 which can be unlocked by suitable means within chamber 1, and interlinked with the bolt 8. Filter material 11 fills the shaft above support 4. This support 4 consists of angle irons arranged side by side and connected at one end to air collecting duct 20 which is connected by air duct 21 to an air pump, for example a bellows 22. Air is drawn into chamber 1 from the outside by bellows 22 through filter material 11, air spaces extending underneath the angle irons of grate 4, air ducts 20 and 21.

On the bottom 23 of shaft 2, a second filter supporting grate 24 is placed from which air duct 25 runs to bellows 22. Air ducts 21 and 25 are connected to bellows 22 by a two-way valve 26. By turning the valve, air can be drawn alternatively through either grate 4 or grate 24.

A gas-tight door 28 is mounted in opening 1a to prevent persons in chamber 1 from inadvertently entering shaft 2, and, upon removal of trap door 7, to prevent the passage of air from the outside directly into chamber 1.

When bolt 8 is unlocked, trap door 7 swings down on hinge 6 and dumps the filter material 11 and the grate 4 to the bottom of the shaft.

In order to prevent the filter grate 24 from being damaged by the impact of the dumped material and grate 4, an impact means, such as louvers 27, is mounted above grate 24, this permitting only the filter material to flow through the openings of the louvers to collect on grate 24. A second new filter unit is thus formed. Material 11 spills into shelter 1 when door 28 is opened, and additional material may be scooped into the shelter down to the door sill 29 in order to allow egress through shaft 2.

A linkage connects bolt 8 to two-way valve 26. The lower portion of rod 30 is connected to valve 26 by rod 30a, and has a handle 31 on its free end. The upper portion of rod 30 is connected by a bell crank 32, on a pivot mounting 33, to bolt 8. When handle 31 is pulled down, bolt 8 is withdrawn to the left so that trap door 7 can drop. At the same time, valve 26 is automatically moved upwardly so that communication is established between bellows 22 and filter supporting grate 24.

Having now described the means by which the objects of the invention are obtained,

I claim:

1. In the combination of an air raid shelter and an escape shaft externally of said shelter and communicating therewith, upper and lower earth filter supporting means mounted in said shaft, and means for manually displacing the upper supporting means for dumping the filter material on top of the lower supporting means to open said shaft for escape purposes.

2. In the combination of claim 1, said upper and lower supporting means comprising filter grates.

3. In the combination of claim 2, said upper supporting means further comprising a trap door supporting said grate.

4. In the combination of claim 3, said trap door having one edge hinged to said shaft, and manually actuated locking means for holding said trap door in closed position.

5. In the combination of claim 1, further comprising bellows means in said shelters, air ducts connected to said upper and lower filter supporting means and extending to said bellows means, and a two-way valve in said air ducts for selectively drawing air through the filter material in either its upper or lower position.

6. In the combination of claim 5, further comprising locking means for the upper filter supporting means interconnecting said locking means and said valve for opening said air duct to the lower filter supporting means upon unlocking said locking means.

7. In the combination of claim 6, further comprising louvered filter material impact means mounted above said lower filter supporting means.

8. In the combination of claim 7, further comprising a door between said shelter and said escape shaft.

References Cited in the file of this patent

UNITED STATES PATENTS

| 964,719 | Wegescheidt | July 19, 1910 |
| 1,538,292 | Lindsay | May 19, 1925 |
| 1,608,678 | Smith | Nov. 30, 1926 |
| 1,895,601 | Beuthner | Jan. 31, 1933 |

FOREIGN PATENTS

| 210,059 | Switzerland | Sept. 2, 1940 |
| 753,300 | Great Britain | July 18, 1956 |
| 864,309 | Germany | Jan. 22, 1953 |